US006923928B1

United States Patent
Feurer

(10) Patent No.: US 6,923,928 B1
(45) Date of Patent: Aug. 2, 2005

(54) METHOD AND DEVICE FOR SHAPING THERMOPLASTIC HOLLOW BOARDS

(75) Inventor: Markus Feurer, Malsch (DE)

(73) Assignee: KR-Porsiplast Verpackungssysteme GmbH, Muggensturm (DE)

(*) Notice: Subject to any disclaimer, the term of this patent is extended or adjusted under 35 U.S.C. 154(b) by 0 days.

(21) Appl. No.: 10/069,535

(22) PCT Filed: Apr. 5, 2000

(86) PCT No.: PCT/EP00/03011

§ 371 (c)(1),
(2), (4) Date: Oct. 25, 2001

(87) PCT Pub. No.: WO00/64659

PCT Pub. Date: Nov. 2, 2000

(30) Foreign Application Priority Data

Apr. 26, 1999 (DE) .......................... 199 18 784

(51) Int. Cl.[7] .............................................. B29C 51/00
(52) U.S. Cl. ................... 264/239; 264/513; 264/572; 264/257; 264/570; 428/188
(58) Field of Search .................. 264/239, 513, 264/572, 257, 570; 156/244.13; 428/119, 178, 188

(56) References Cited

U.S. PATENT DOCUMENTS

| 1,448,351 A | * | 3/1923 | Kirlin ............................ 65/34 |
| 4,172,749 A | | 10/1979 | Liggett |
| 4,515,648 A | * | 5/1985 | Kolbe et al. ................. 156/196 |
| 5,198,240 A | * | 3/1993 | Baxi ........................... 425/145 |
| 5,238,725 A | | 8/1993 | Effing et al. |
| 5,277,865 A | * | 1/1994 | Hara et al. .................. 264/516 |
| 6,063,315 A | * | 5/2000 | Keller et al. ............... 264/40.1 |

FOREIGN PATENT DOCUMENTS

| DE | 2053318 | 5/1972 |
| DE | 2912772 | 7/1980 |
| DE | 196 04 613 A1 | 8/1997 |
| EP | 0135708 | 4/1985 |
| EP | 0558989 | 9/1993 |
| EP | 0646619 | 4/1995 |
| EP | 0649736 | 4/1995 |
| EP | 0778310 | 6/1997 |
| FR | 2208767 | 6/1974 |
| FR | 2607434 | 6/1988 |

* cited by examiner

*Primary Examiner*—Chris Fiorilla
*Assistant Examiner*—Michelle Acevedo Lazor
(74) *Attorney, Agent, or Firm*—Friedrich Kueffner

(57) ABSTRACT

The invention relates to a method of shaping hollow boards (11) that consist of a thermoplastic material and that have at least one cavity (17) in the interior of the board that is open towards the board edge (18). According to the inventive method, said cavity (17) is sealed at the board edge (1), thereby closing the cavity towards the exterior in a substantially gas-tight manner. Once the cavity (17) is closed in this manner, the hollow board (11) that has been softened by heating is shaped by a shaping pressure to which it is subjected from the exterior. The invention also relates to a device for carrying out the inventive method. The invention provides a method and a device which prevents the interior structure of the hollow board being deformed in an undesirable manner during the shaping process.

4 Claims, 2 Drawing Sheets

METHOD AND DEVICE FOR SHAPING THERMOPLASTIC HOLLOW BOARDS

BACKGROUND OF THE INVENTION

1. Field of the Invention

The invention relates to a method for shaping hollow boards that are comprised of thermoplastic material and have at least one cavity within the board interior being open toward the edge of the board, wherein the cavity in the interior of the board is sealed at the board edge and is thus closed off to the exterior in a substantially gas-tight way and wherein the hollow board to be shaped is softened by heating and is shaped in the softened state by external loading with a shaping pressure while the cavity is closed off in a substantially gas-tight way.

2. Description of the Related Art

Known thermoplastic hollow boards are comprised of two parallel cover layers as well as spacers arranged therebetween, for example, in the form of separating stays or cup-shaped projections of an intermediate layer provided between the cover layers. In this connection, in the interior of the hollow boards, i.e., between their cover layers, cavities are provided which are open toward the board edge. For the shaping process, such thermoplastic hollow boards open toward the edge are softened by supplying heat, as is known in the art, and are loaded with an external shaping pressure in the softened state, for example, by means of deepdrawing devices or presses. Because of the destabilization of the hollow board in itself resulting from softening, in particular, of the spacers arranged between its cover layers, the shaping of the hollow boards according to the methods of the prior art or by means of the known devices often entails an undesirable change of the board structure, primarily an undesirable irreversible compression of the hollow boards perpendicularly to the cover layers.

A method of the aforementioned kind is disclosed in U.S. Pat. No. 4,172,749. Here, the hollow boards are shaped with cavities being open toward the edge. The cavities are filled with a gaseous medium, for example, air. Before the start of the actual shaping process, the gas-filled cavities are closed in a gas-tight way at the edge of the hollow board. The hollow board is finally shaped with the cavities being closed in this way. The gaseous medium present within the interior of the cavities thus builds up a pressure which counteracts the external shaping pressure and is supposed to prevent undesirable compression of the hollow board to be shaped.

SUMMARY OF THE INVENTION

Based on this prior art, the present invention has the object to optimize the shape stability of hollow boards to be shaped or formed.

This object is solved according to the invention in that the at least one cavity within the interior of the board is sealed by leaving open at least one supply opening for a filling medium to be supplied to the cavity or in that, after complete closure of the cavity, at least one supply opening for the filling medium is introduced into the wall of the cavity and that the cavity, which is closed off to the exterior in a substantially gas-tight way, is loaded with at least one filling medium and in that the hollow board to be shaped is shaped by being loaded externally with the shaping pressure while the cavity is filled with the filling medium. The one or more filling media assist pressure build-up in the interior of the cavity. By leaving open at least one supply opening for the filling medium to be supplied to the cavity, the condition is realized in a simple way to be able to supply the filling medium to the cavity. The medium enclosed within the interior of the cavity exerts a counterpressure to the external shaping pressure, when the hollow board is loaded from the exterior with the shaping pressure, and thus provides a stabilization of the hollow board. Despite its softening, the hollow board can therefore maintain its proper structure even during the shaping process.

For sealing the cavity at the board edge, several possibilities are offered according to the invention. For example, a sealing sleeve can be placed onto the board edge. Preferably, the cavity in the interior of the board is sealed by compressing the board edge. This method feature is characterized by a simple realization. In this connection, the compression of the edge of the board can be carried out when the hollow board is "cold" as well as when the hollow board is heated and thus at least partially plasticized.

In a further preferred embodiment of the method according to the invention, a filling medium whose temperature surpasses the initial temperature of the hollow board to be shaped is employed. In this case, the filling medium not only contributes to the build-up of inner pressure within the cavity of the hollow board but is also moreover utilized for heating and thus plasticizing the hollow board. In this connection, the plasticization of the hollow board can be realized exclusively by means of the filling medium; however, the filling medium can also be used only for assisting additional heat sources for supplying heat to the hollow board from the exterior. In the latter case, especially short cycle times result for shaping of the corresponding hollow boards.

In the context of the method according to the invention, the cavity in the interior of the hollow board can be loaded with almost any flowable filling medium, in particular, with almost any gaseous or liquid filling medium. In this connection, it is especially advantageous to supply the cavity, which is closed off to the exterior in a substantially gas-tight way, with steam as a filling medium. Steam can be generated in a simple way and is characterized, in particular, by being ecologically innocuous.

BRIEF DESCRIPTION OF THE DRAWING

In the following the invention will be described in more detail with the aid of schematic illustrations. It is shown in.

DETAILED DESCRIPTION OF THE INVENTION

Figure 1:
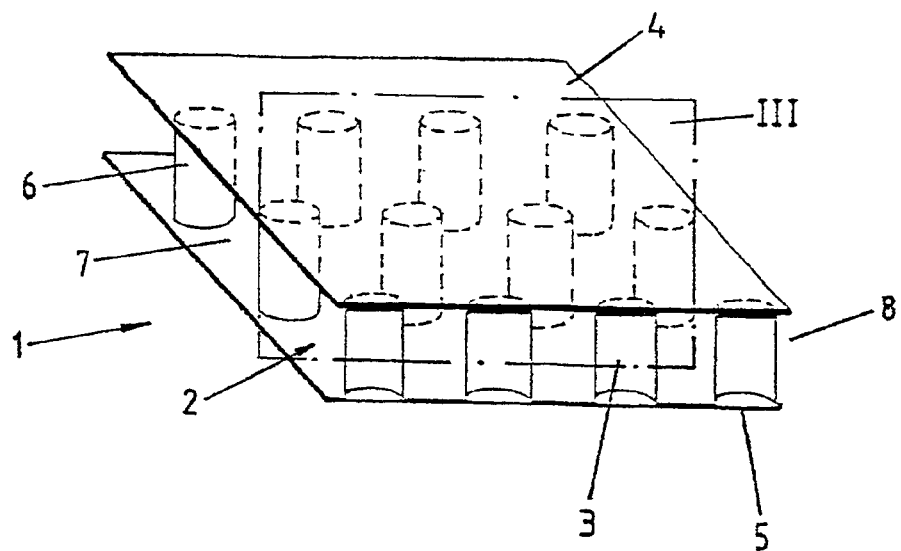
FIGS. 1 and 2 configurations of hollow boards of thermoplastic material with cavities within the interior of the board.

According to FIG. 1, a hollow board 1 of polypropylene, as they are, for example, used for manufacturing packaging containers or trunk bottom plates of vehicles, are of a three-layer configuration. An intermediate layer 2 with downwardly open cupshaped projections 3 is welded to an upper cover layer 4 and a lower cover layer 5. The cup-shaped projections 3 are arranged at a spacing to one another and form together with the walls 6 gas enclosures containing atmospheric air. A part of the walls 6 is formed by the lower cover layer 5. Since the cup-shaped projections 3 are arranged in a staggered fashion, a contiguous cavity 7 results around them in the interior of the hollow board 1 which cavity is open toward the board edge 8 of the hollow board 1.

Figure 3:
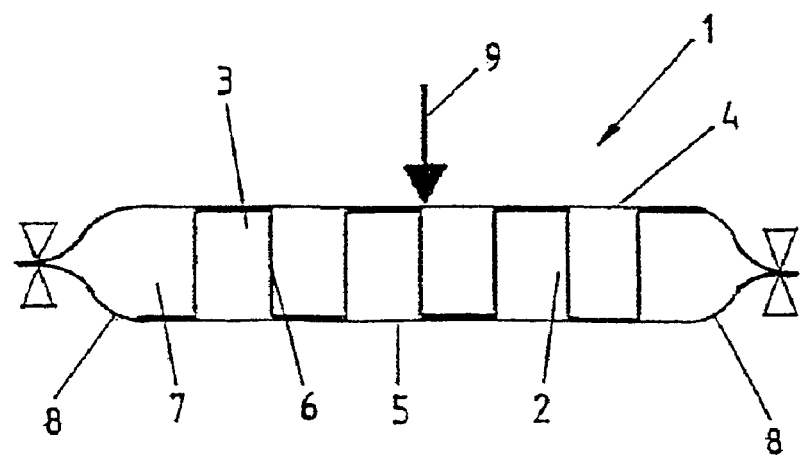
FIG. 3 a schematic section of the hollow board according to FIG. 1 with a cavity in the interior of the board sealed according to a conventional method.

In a manner known in the art, for shaping the hollow board 1, first its board edge 8 is compressed about the entire circumference of the board. The conditions illustrated in FIG. 3 then result. The section plane of FIG. 3 is identified in FIG. 1 with reference numeral III. After the compression of the board edge 8, the cavity 7 in the interior of the hollow board 1 is sealed in a gas-tight way to the exterior. The board edge 8 is maintained in the compressed state by corresponding pressure exertion schematically illustrated in FIG. 3.

In the state according to FIG. 3, the hollow board 1 is loaded with steam from the exterior and is heated in this way. As a result of heating, plasticization of the hollow board 1 takes place. The softened hollow board 1 is finally shaped, for example, so as to cause depressions within the hollow board 1, by means of the shaping pressure, indicated in FIG. 3 by the arrow 9. During loading of the hollow board 1 with the external shaping pressure 9, the atmospheric air in the cavity 7 in the interior of the hollow board 1, enclosed by the pressure-loaded board edge 8, acts as an air cushion which exerts a pressure counteracting the shaping pressure 9 and thus prevents a compression of the softened hollow board 1 by the shaping pressure 9.

After the shaping process, the obtained shaped part is stabilized over all by cooling. The deformed board edge 8 can then be removed.

Figure 2:
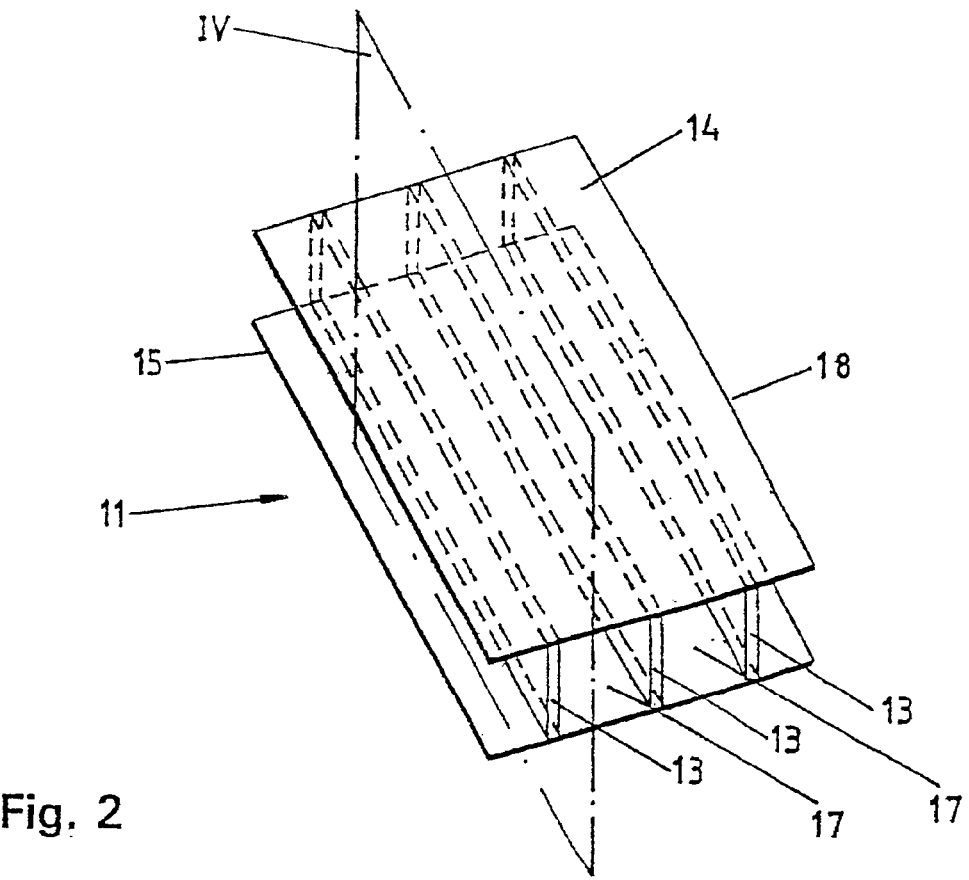

As illustrated in FIG. 2, a hollow board 11 is comprised of an upper cover layer 14, a lower cover layer 15 as well as spacers in the form of separating stays 13 arranged between the upper cover layer 14 and the lower cover layer 15. In the interior of the hollow board 1, cavities 17 are present, which are delimited by the upper cover layer 14, the lower cover layer 15, as well as two oppositely positioned separating stays 13, wherein the cavities 17 open toward the board edge 18. The hollow board 11 is also comprised of polypropylene.

Figure 4:
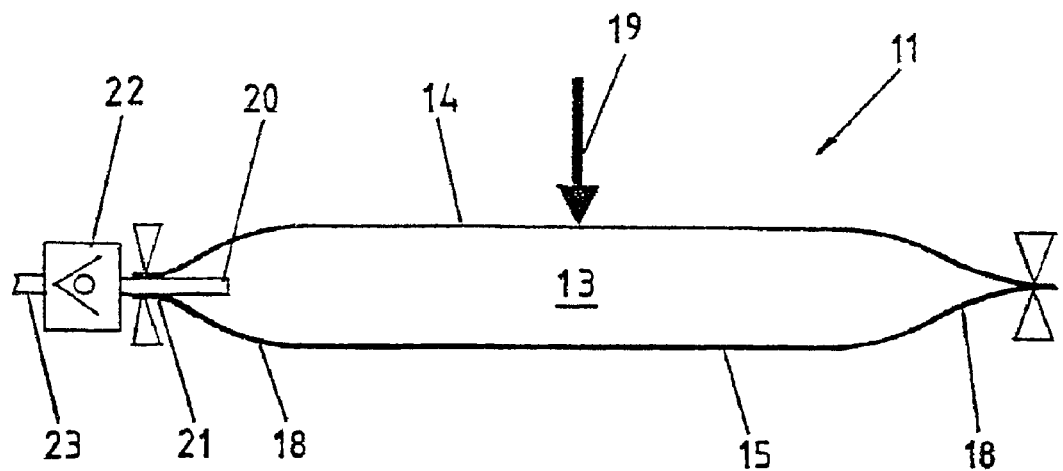
FIG. 4 a schematic section of the hollow board according to FIG. 2 with cavities in the interior of the board sealed according to the invention.

As already described in the case of the hollow board 1 according to FIGS. 1 and 3, first its board edge 18 is compressed about the entire circumference of the hollow board 11 for shaping the hollow board 11. However, in contrast to the above described method, before deforming the board edge 18, hollow injection needles 20 projecting into the cavities 17 are positioned between the upper cover layer 14 and the lower cover layer 15. The hollow injection needles 20 ensure that, after compression of the plate edge 18, supply openings 21 for the filling medium to be introduced into the cavity 17 remain open. This is illustrated in detail in FIG. 4. In FIG. 4 it is also indicated that the board edge 18 after compression remains pressure-loaded.

According to FIG. 4, the hollow injection needles 20 are connected by check valves 22 to supply lines 23 for the filling medium. At the end of the cavities 17 facing away from the hollow injection needles 20, the board edge 18 is compressed as described in connection with FIGS. 1 and 3. Over all, the hollow cavities 17 are closed off to the exterior in a substantially gas-tight way. After compression of the board edge 18, filling medium in the form of steam is supplied via the hollow injection needles 20 into the interior of the cavities while pressure loading of the board edge 18 still occurs. This steam supplied via the hollow injection needles 20, in cooperation with steam with which the hollow board 1 is simultaneously loaded from the exterior, effects heating and plasticization of the hollow board. The hollow board 11 is also shaped after softening by means of an external shaping pressure, symbolically indicated in FIG. 3 by an arrow 19. The mixture of atmospheric air and steam present in the interior of the cavities 17 counteracts in the above described way, when the check valves 22 are in their closed position, an undesirable structural change of the hollow board 11. If needed, filling medium can be supplied to the cavities 17 even during loading of the hollow board 11 with the external shaping pressure 19.

After cooling and the resulting solidification of the shaped hollow board 11, the hollow injection needles 20 are pulled out of the supply openings 21 and, subsequently, the deformed board edge 18 is removed. Alternatively, the hollow injection needles 20 can be removed already before loading of the hollow board 11 with the external shaping pressure 19. In this case, immediately after pulling out the hollow injection needles 20, the supply openings 21 for the previously supplied filling medium which remain within the board edge 18 must be sealed tightly before the shaping of the hollow board 11 can be started.

What is claimed is:

1. A method for modifying the shape of hollow boards of thermoplastic material having at least one open cavity in an interior of the board open toward a board edge, wherein the cavity in the interior of the board is sealed at the board edge and is thereby closed off to the exterior in a substantially gas-tight way, the method comprising softening by heating the hollow board whose shape is to be modified and modifying the shape of the hollow board in the softened state by external loading with a shaping pressure while the cavity is closed off to the exterior in a substantially gas-tight way, and sealing the cavity while leaving open at least one supply opening for the filling medium to be supplied to the cavity, or, after complete closure of the cavity, introducing at least one supply opening for a filling medium into the wall of the cavity and supplying the cavity which is closed off to the exterior in a substantially gas-tight way with a filling medium whose temperature surpasses the initial temperature of the hollow board whose shape is to be modified, and modifying the shape of the hollow board by external loading with the shaping pressure while the cavity is filled with the filling medium.

2. The method according to claim 1, comprising sealing the cavity by compressing the board edge.

3. The method according to claim 1, comprising loading the cavity which is closed off to the exterior in a substantially gas-tight way with at least one gaseous and/or at least one liquid filling medium.

4. A method for modifying the shape of hollow boards of thermoplastic material having at least one open cavity in an interior of the board open toward a board edge, wherein the cavity in the interior of the board is sealed at the board edge and is thereby closed off to the exterior in a substantially gas-tight way, the method comprising softening by heating the hollow board whose shape is to be modified and modifying the shape of the hollow board in the softened state by external loading with a shaping pressure while the cavity is closed off to the exterior in a substantially gas-tight way, and sealing the cavity while leaving open at least one supply opening for the filling medium to be supplied to the cavity, or, after complete closure of the cavity, introducing at least one supply opening for a filling medium into the wall of the cavity and supplying the cavity which is closed off to the exterior in a substantially gas-tight way with at least one filling medium, and modifying the shape of the hollow board by external loading with the shaping pressure while the cavity is filled with the filling medium, comprising filling the hollow cavity which is closed off to the exterior in a substantially gas-tight way with steam as a filling medium.

* * * * *